United States Patent
Liu et al.

(10) Patent No.: US 11,624,616 B1
(45) Date of Patent: Apr. 11, 2023

(54) MULTI-MODE VISUAL GEOMETRY LOCALIZATION

(71) Applicant: PlusAI, Inc., Cupertino, CA (US)

(72) Inventors: Kuan-Wei Liu, Santa Clara, CA (US); Mianwei Zhou, Santa Clara, CA (US); Yibo Chen, San Jose, CA (US)

(73) Assignee: PlusAI, Inc., Cupertino, CA (US)

(*) Notice: Subject to any disclaimer, the term of this patent is extended or adjusted under 35 U.S.C. 154(b) by 0 days.

(21) Appl. No.: 17/844,655

(22) Filed: Jun. 20, 2022

(51) Int. Cl.
  *G01C 21/30* (2006.01)
  *G06T 7/70* (2017.01)
  *G06V 20/56* (2022.01)

(52) U.S. Cl.
  CPC ............... *G01C 21/30* (2013.01); *G06T 7/70* (2017.01); *G06V 20/56* (2022.01); *G06V 20/588* (2022.01); *G06T 2207/30256* (2013.01)

(58) Field of Classification Search
  None
  See application file for complete search history.

(56) References Cited

U.S. PATENT DOCUMENTS

| | | | | |
|---|---|---|---|---|
| 10,943,130 | B2* | 3/2021 | Schack | G06T 7/70 |
| 11,073,399 | B2* | 7/2021 | Lee | G01C 21/3602 |
| 11,094,198 | B2* | 8/2021 | Fu | G01C 21/34 |
| 11,408,741 | B2* | 8/2022 | Miyake | G01C 21/30 |
| 2018/0188027 | A1 | 7/2018 | Zhang et al. | |
| 2020/0182625 | A1* | 6/2020 | Yuan | H04W 4/023 |
| 2021/0364320 | A1* | 11/2021 | Mennen | G06V 10/82 |
| 2021/0407186 | A1 | 12/2021 | Del Pero et al. | |
| 2022/0161793 | A1* | 5/2022 | Wang | G01C 21/3848 |
| 2022/0256082 | A1* | 8/2022 | Namba | G01C 21/30 |

* cited by examiner

*Primary Examiner* — Todd Melton
(74) *Attorney, Agent, or Firm* — Sheppard Mullin Richter & Hampton LLP

(57) ABSTRACT

Systems, methods, and non-transitory computer readable media can perform operations comprising generating a first type of pose and a second type of pose based on visual geometry localization; determining a mode for planning a planning path for a vehicle based on at least one of the first type of pose and the second type of pose; and generating the planning path for the vehicle based on the mode.

20 Claims, 11 Drawing Sheets

MULTI-MODE VISUAL GEOMETRY LOCALIZATION

FIELD OF THE INVENTION

The present technology relates to autonomous systems. More particularly, the present technology relates to visual geometry localization for autonomous systems of vehicles.

BACKGROUND

The determination of pose is fundamental for autonomous systems of vehicles, such as trucks. Accurate determinations of pose for an autonomously driving truck are vital to, for example, path planning and safe navigation. Localization involves, for example, matching objects in an environment in which a truck is driving with features from high definition (HD) maps so that the truck can determine its precise pose in real time.

SUMMARY

Various embodiments of the present technology can include systems, methods, and non-transitory computer readable media configured to perform operations comprising determining visual geometry detections (e.g., lane line detections) associated with geometry corresponding with a map; aligning the visual geometry detections with the geometry based on transformations associated with selected degrees of freedom; and determining a pose of a vehicle based on alignment of the visual geometry detections with the geometry.

In an embodiment, the operations further comprise generating a grid map based on the geometry, wherein the grid map includes a grid of cells and the cells are associated with values based on presence or absence of a boundary line in the geometry.

In an embodiment, the operations further comprise generating a score for the visual geometry detections based on the visual geometry detections overlaid on the grid map.

In an embodiment, the operations further comprise determining a set of poses, including the pose, based on a set of visual geometry detections, including the visual geometry detections, wherein the pose is determined from the set of poses based on a trajectory of the vehicle.

In an embodiment, the operations further comprise loading a high definition (HD) map based on a GPS position.

In an embodiment, the transformations associated with selected degrees of freedom are transformations with respect to pitch, yaw, x-axis, and y-axis, and a transformation with respect to yaw is determined based on transformation with respect to pitch.

In an embodiment, the transformation with respect to yaw is based on a median angle difference determined based on alignment of the visual geometry detections with the geometry with respect to pitch.

In an embodiment, the aligning the visual geometry detections comprises aligning the visual geometry detections based on transformations with respect to pitch and yaw; and subsequent to the aligning the visual geometry detections based on transformations with respect to pitch and yaw, aligning the visual geometry detections based on transformations with respect to the x-axis and y-axis.

In an embodiment, the aligning the visual geometry detections does not perform transformations with respect to roll and z-axis.

In an embodiment, the visual geometry detections include detected lane lines and the geometry includes lane boundary lines.

Various embodiments of the present technology can include systems, methods, and non-transitory computer readable media configured to perform operations comprising generating a first type of pose and a second type of pose based on visual geometry localization; determining a mode for planning a planning path for a vehicle based on at least one of the first type of pose and the second type of pose; and generating the planning path for the vehicle based on the mode.

In an embodiment, the first type of pose is a local result pose and the second type of pose is a global result pose.

In an embodiment, the operations further comprise generating, in a normal mode, a fusion result pose based on the local result pose, wherein the planning path is generated based on the fusion result pose; and determining a difference between the local result pose and the global result pose.

In an embodiment, the operations further comprise operating in the normal mode based on the difference between the local result pose and the global result pose being within a threshold distance and a variance of the difference being within a threshold variance; or operating in a re-localization mode based on the difference between the local result pose and the global result pose being at least the threshold distance for a threshold period of time.

In an embodiment, the operations further comprise generating, in a re-localization mode, a fusion result pose based on the global result pose, wherein the planning path is generated based on the fusion result pose; and determining a difference between the global result pose and the fusion result pose.

In an embodiment, the operations further comprise operating in the re-localization mode based on the difference between the global result pose and the fusion result pose being at least a threshold distance; or operating in a normal mode based on the difference between the global result pose and the fusion result pose being within the threshold distance for a threshold period of time and a variance of the difference being within a threshold variance.

In an embodiment, the global result pose is generated based on a global search of a high definition (HD) map, the local result pose is generated based on a local search of a portion of the HD map, and the global search restricts the global result pose to a global range associated with a road, and wherein the local search restricts the local result pose to a local range associated with a lane in the road.

In an embodiment, a fusion result pose is generated based on localization results from localization processes other than the visual geometry localization and based on at least one of the first type of pose and the second type of pose.

In an embodiment, the mode is a normal mode, and the planning path is generated based on a driving path in an HD map.

In an embodiment, the mode is a re-localization mode, and the planning path is generated based on lane tracking.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
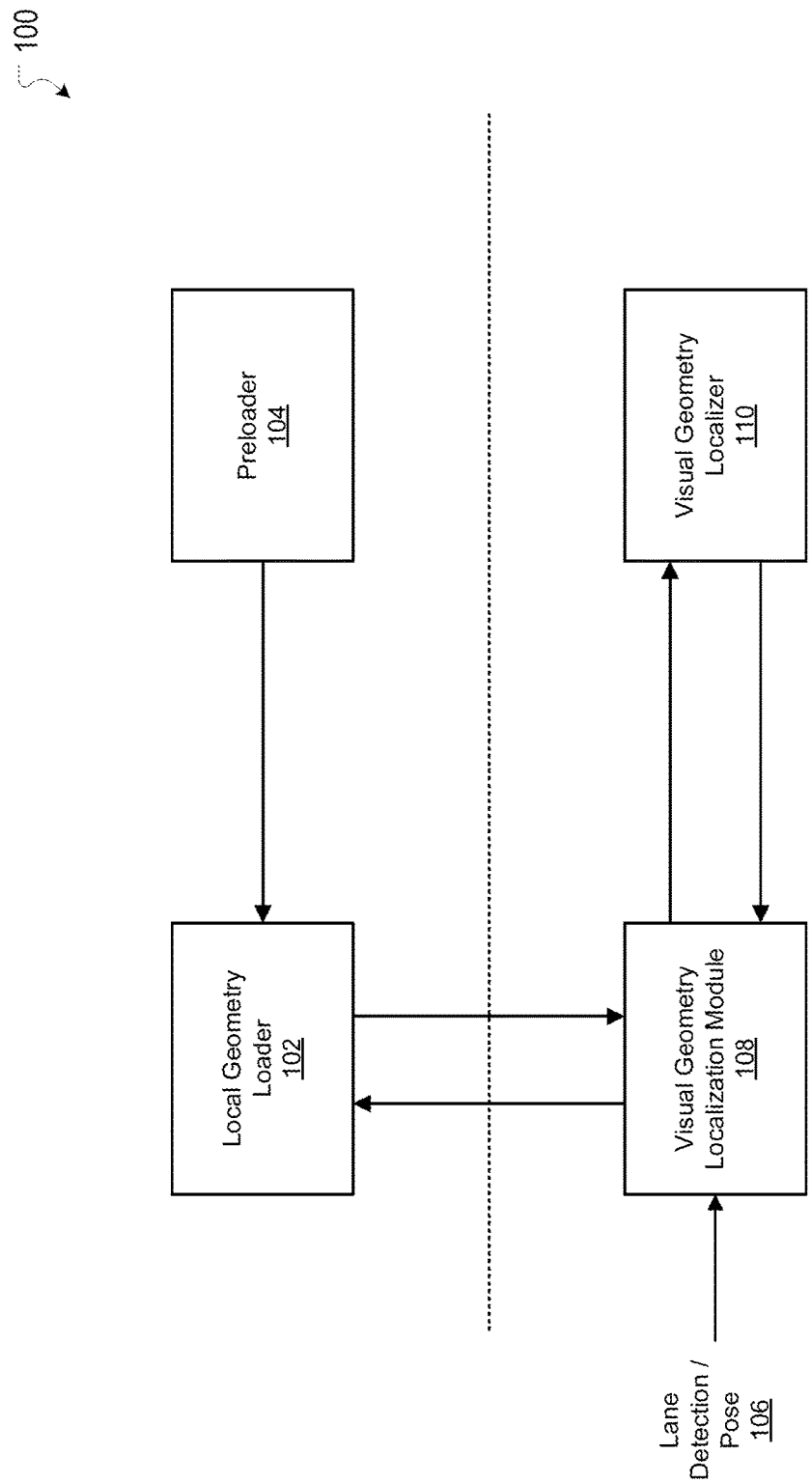
FIG. 1 illustrates an example system, according to some embodiments of the present technology.

The figures depict various embodiments of the present technology for purposes of illustration only, wherein the figures use like reference numerals to identify like elements. One skilled in the art will readily recognize from the following discussion that alternative embodiments of the methods, computer readable media, and systems illustrated in the figures can be employed without departing from the principles of the present technology described herein.

DETAILED DESCRIPTION

VISUAL GEOMETRY LOCALIZATION

Autonomous systems of vehicles rely on localization for various functions, such as path planning and safe navigation. With localization, an autonomous system can have an accurate determination of where a vehicle is located. Based on the accurate determination of where the vehicle is located, the autonomous system can, for example, plan a path that safely navigates the vehicle through an environment. Thus, localization is critical to autonomous system functions that rely on an accurate determination of location. However, various conventional localization techniques, such as those based on GPS or LiDAR, can fail to provide accurate determinations of location.

GPS localization, for example, can suffer from effects of noise and drift. The effects of noise and drift can introduce a bias in GPS localization that makes determinations of location based on GPS localization imprecise. Thus, GPS localization may not be sufficiently precise for exacting requirements of autonomous driving. For example, when bias arises due to noise and drift, GPS localization can fail to provide a precise determination of which lane of a road a vehicle is located in.

LiDAR localization can rely on data-heavy point clouds, which can be difficult to scale up, to determine locations for vehicles. Therefore, LiDAR localization is inefficient while navigating an environment. Further, LiDAR performance can suffer due to environmental factors, such as inclement weather. LiDAR localization can fail, for example, when an environment is experiencing rain, snow, or fog. Further, LiDAR can fail to detect certain map landmarks. Because LiDAR can fail to detect certain map landmarks, LiDAR localization that attempts to determine a location of a vehicle relative to those map landmarks can fail to provide an accurate determination of location. For example, LiDAR localization may fail to detect lane marking dots on a road.

As a result, the LiDAR localization may not identify the lane boundaries on the road. Without identification of the lane boundaries on the road, the LiDAR localization may be unable to determine, for example, in which lane of a road a vehicle is located. Thus, precise localization, which is critical to autonomous system functions and applications, suffers from significant technological challenges.

The present technology provides improved approaches to localization that overcome disadvantages of conventional techniques. In various embodiments of the present technology, a precise location of a vehicle can be determined based on visual geometry localization. The visual geometry localization can involve receiving captured image data. Visual geometry detections, such as detected lane lines (or lane line detections), can be detected in the captured image data. The detected lane lines can indicate where lane boundaries are in the captured image data. The lane lines detected in the captured image data can be aligned with lane boundary line geometry in a high definition (HD) map. With the detected lane lines in the captured image data aligned with the lane boundary line geometry in the HD map, a precise location of the vehicle can be determined with respect to the associated lane lines. Thus, visual geometry localization provides for localization with lane-level precision.

The present technology provides for efficient alignment of visual geometry detections from captured image data with local geometry in an HD map. For example, visual geometry detections can be associated with detected lane lines and local geometry can be associated with lane boundary line geometry. In general, image data can be associated with six degrees of freedom (e.g., pitch, yaw, roll, x-axis, y-axis, z-axis) corresponding with a pose of a camera that captured the image data. The alignment of the lane lines detected in the captured image data with the lane boundary line geometry in the HD map can be performed by searching for a transformation of the detected lane lines that aligns the detected lane lines with the lane boundary line geometry in the HD map. In various embodiments, aligning lane lines detected in captured image data with lane boundary line geometry in an HD map can involve a search for rotational (or angle) transformations (e.g., pitch, yaw, roll) and a search for translational transformations (e.g., x-axis, y-axis, z-axis). The search for rotational transformations can be based on certain rotational degrees of freedom (e.g., pitch) instead of all three rotational degrees of freedom (e.g., pitch, yaw, roll). Based on the search for rotational transformations involving the certain rotational degrees of freedom (e.g., pitch), other rotational transformations based on other rotational degrees of freedom can be determined (e.g., yaw). In some cases, certain rotational degrees of freedom (e.g., roll) can be disregarded, and transformations associated with those rotational degrees of freedom are not performed. The search for translational transformations can be based on certain translational degrees of freedom (e.g., x-axis, y-axis) instead of all three translational degrees of freedom (e.g., x-axis, y-axis, z-axis). In some cases, certain translational degrees of freedom (e.g., z-axis) can be disregarded, and transformations associated with those translational degrees of freedom are not performed. By searching for rotational transformations based on some, but not all, rotational degrees of freedom and translational transformations based on some, but not all, translational degrees of freedom, lane lines detected in captured image data can be aligned with lane boundary line geometry in an HD map more efficiently than by searching for a transformation involving all six degrees of freedom. As illustrated here, an alignment of lane lines with lane boundary line geometry based on decoupled searches for rotational transformations with two degrees of freedom and translational transformations with two degrees of freedom would have a time complexity of $O(n^2)$ whereas an alignment based on a search of six degrees of freedom would have a time complexity of $O(n^6)$. Thus, an alignment in accordance with the present technology poses advantages relating to reduced need for computing resources and faster calculations relating to vehicle localization.

Searches for transformations to align lane lines detected from captured image data with geometry of lane boundary lines in an HD map can be evaluated by determining aligning scores associated with the searches. To determine the aligning scores, the lane boundary line geometry of the HD map can be converted to a grid map of values corresponding with the presence of a lane boundary. The detected lane lines transformed in accordance with a search can be overlaid on the grid map to determine an aligning score for the search. Searches for transformations to align detected lane lines with a lane boundary line geometry can be compared based on their aligning scores. Based on the comparison, transformations can be applied to the lane boundary lines. Visual geometry localization can be performed based on the aligned lane boundary lines and the HD map to determine a precise location of a vehicle.

As an illustrative example, a vehicle can navigate an environment. An autonomous system on the vehicle can determine where the vehicle is in the environment based on visual geometry localization. In performing the visual geometry localization, the autonomous system can capture image data through various sensors (e.g., cameras) on the vehicle. Lane lines can be detected in the captured image data. The detected lane lines can be aligned to lane boundary line geometry in an HD map of the environment. For example, the detected lane lines can be aligned by performing searches for pitch transformations to apply to the detected lane lines. Based on the pitch transformations, yaw transformations can be determined for the detected lane lines. The pitch transformations and the yaw transformations can be applied to the detected lane lines to rotationally align the detected lane lines with the lane boundary line geometry. The rotationally aligned lane lines can be translationally aligned with the lane boundary line geometry by performing searches for x-axis translations and y-axis translations to apply to the rotationally aligned lane lines. In this example, aligning scores can be determined for the searches for transformations to align the detected lane lines with the lane boundary line geometry. Based on the aligning scores, the searches can be compared to determine which transformations to apply to the detected lane lines. For example, the transformations of the search associated with the highest aligning score can be applied to the detected lane lines to align the lane detection lines with the lane boundary line geometry. Once the detected lane lines are aligned with the lane boundary line geometry, the autonomous system can precisely determine where the vehicle is located in the environment. These and other inventive features and related advantages of the various embodiments of the present technology are discussed in more detail herein.

FIG. 1 illustrates an example system 100 including a local geometry loader 102, a preloader 104, a visual geometry localization module 108, and a visual geometry localizer 110, according to some embodiments of the present technology. In some embodiments, some or all of the functionality performed by the example system 100 may be performed by one or more computing systems implemented in any type of vehicle, such as an autonomous vehicle. In some embodiments, some or all of the functionality performed by the example system 100 may be performed by one or more backend computing systems. In some embodiments, some or all of the functionality performed by the example system 100 may be performed by one or more computing systems associated with (e.g., carried by) one or more users riding in a vehicle. In some embodiments, some or all data processed and/or stored by the example system 100 can be stored in a data store (e.g., local to the example system 100) or other storage system (e.g., cloud storage remote from the example system 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the example system 100 can be implemented in any suitable combinations.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In various embodiments, information associated with an environment can be based on sensor data. The sensor data may be collected by, for example, sensors mounted to a vehicle and/or sensors on computing devices associated with users riding in the vehicle. The sensor data may include data captured by one or more sensors including, for example, optical cameras, LiDAR, radar, infrared cameras, and ultrasound equipment. The sensor data can be obtained from a data store or from sensors associated with a vehicle in real-time (or near real-time). In some embodiments, information related to sensor data can be obtained, such as a calendar date, day of week, and time of day during which the sensor data was captured. Such related information may be obtained from an internal clock of a sensor or a computing device, one or more external computing systems (e.g., Network Time Protocol (NAP) servers), or GPS data, to name some examples. Many variations are possible.

In FIG. 1, the preloader 104 can provide a high definition (HD) map, or a portion of the HD map, for use in visual geometry localization. In general, HD maps are detailed, accurate maps that can be used by autonomous systems to navigate an environment. The HD maps can include details captured by various types of sensors. The HD maps can include map elements such as road shape, road markings, traffic signs, and boundaries, such as lane boundary line geometry. In various embodiments, the preloader 104 can provide an HD map, or a portion of the HD map, that corresponds with an environment in which a vehicle is navigating. The preloader 104 can determine which HD map to provide based on a location of the vehicle, a trajectory of the vehicle, or a planned path of the vehicle. For example, a vehicle can be navigating an environment. The preloader 104 can determine or predict, based on a current trajectory and a planned path of the vehicle, a location where the vehicle is likely to be. The preloader 104 can provide an HD map that corresponds with the location. Thus, when the vehicle arrives at the location, the HD map that corresponds with the location is readily available.

The local geometry loader 102 can provide local geometry based on an HD map. In various embodiments, the local geometry loader 102 can inherit from the preloader 104 or receive an HD map from the preloader 104. The local geometry loader 102 can provide geometry, such as local geometry, based on the HD map, or a portion of the HD map. The local geometry can include information such as geometry of lane boundary lines. The lane boundary line geometry provides the size, shape, and location of lane boundaries in an environment. The lane boundary line geometry can indicate types of lane boundaries (e.g., solid line, dotted line, dashed line). In some cases, the local geometry can include other information such as road geometry and road markings. The local geometry can be provided to, for example, the visual geometry localization module 108. Visual geometry localization can be performed based on the local geometry. For example, the local geometry loader 102 can generate local geometry based on an HD map of an environment in which a vehicle is navigating. In this example, the environment can include a road segment with three lanes. The local geometry for the environment can include lane boundary line geometry describing the size, shape, and location of lane boundaries associated with the three lanes of the road segment. The lane boundary line geometry can also describe the types of lane boundaries associated with the three lanes of the road segment. For example, the lane boundaries marking the edges of the road segment can be solid lines. The lane boundaries separating the three lanes of the road segment can be dashed lines.

The visual geometry localization module 108 can provide position information to the local geometry loader 102. The visual geometry localization module 108 can receive lane boundary line geometry from the local geometry loader 102 based on the position information. The visual geometry localization module 108 can receive detected lane lines (or lane line detections) and a pose based on sensor data from a perception system. The pose from the perception system can be a rough (or approximate) pose and provide sufficient precision to determine a road in which a vehicle is located (e.g., road-level precision). For example, the rough pose can be based on GPS localization. The visual geometry localization module 108 can provide the detected lane lines, the lane boundary line geometry, and the rough pose to the visual geometry localizer 110. The visual geometry localization module 108 can receive a pose from the visual geometry localizer 110. The pose from the visual geometry localizer 110 can be a precise pose and provide sufficient precision to determine a lane in which a vehicle is located (e.g., lane-level precision). The position information provided to the local geometry loader 102 can be based on the precise pose or, in some cases, the rough pose. While discussion provided herein may reference detected lane lines (or lane line detections) and lane boundary line geometry as examples, the present technology can apply to other types of visual geometry detections and local geometry. Many variations are possible.

The visual geometry localizer 110 can align detected lane lines with lane boundary line geometry. In various embodiments, the visual geometry localizer 110 can receive detected lane lines and a pose from the visual geometry localization module 108 or, in some cases, a perception system. The received pose can be a rough pose and provide sufficient precision to determine a road in which a vehicle is located (e.g., road-level precision). The visual geometry localizer 110 can align the detected lane lines with lane boundary line geometry of an environment associated with the received pose.

The visual geometry localizer 110 can align the detected lane lines with the lane boundary line geometry based on a search for rotational transformations (e.g., pitch, yaw, roll) and translational transformations (e.g., x-axis, y-axis, z-axis) associated with less than six degrees of freedom. The search for rotational transformations can align the detected lane lines with the lane boundary line geometry with respect to rotation (e.g., angle). The search for translational transformations can align the detected lane lines with the lane boundary line geometry with respect to translation (e.g., offset).

The search for rotational transformations can disregard (not consider) roll transformations. Roll transformations can be disregarded based on a flat plane assumption or disregarded as acceptable error within a selected level of tolerance. In the search for rotational transformations, a search for a pitch transformation can be performed.

The search for a pitch transformation can determine a pitch transformation that aligns the detected lane lines such that the detected lane lines are parallel with each other. In addition, or alternatively, the search for a pitch transformation can determine a pitch transformation such that angle differences between detected lane lines and corresponding lane boundary line geometry is constant and with a low variance (e.g., the angle differences are within a threshold delta). The pitch transformation aligns the detected lane lines with respect to pitch.

A yaw transformation can be determined based on the pitch transformation. Based on the pitch transformation, the detected lane lines can be aligned with respect to pitch and projected on the lane boundary line geometry. An angle difference between each lane detection line as projected and corresponding lane boundary lines in the lane boundary line geometry can be determined. A yaw transformation can be based on a median angle difference (or a mean angle difference) of the angle differences between the detected lane lines and the lane boundary lines. The median angle difference (or the mean angle difference) can be referred to as a yaw error. The yaw transformation can align the detected lane lines with respect to yaw. In some cases, a yaw transformation can be determined for each pitch transformation in a search for pitch transformations. In some cases, a yaw transformation can be determined after a pitch transformation has been determined and applied to detected lane lines. In either case, a search for rotational transformations to align detected lane lines with lane boundary line geometry can be performed with linear time complexity.

After rotational transformations align detected lane lines with lane boundary geometry with respect to rotation (e.g., angle), a search for translational transformations can be performed to align the detected lane lines and the lane boundary geometry with respect to translation (e.g., offset). The search for translational transformations can disregard (not consider) z-axis. The z-axis can be disregarded based on a flat plane assumption or disregarded as acceptable error within a selected level of tolerance. In the search for translational transformations, a search for an x-axis transformation (e.g., horizontal translation, horizontal offset) and a search for a y-axis transformation (e.g., vertical translation, vertical offset) can be performed. The search for an x-axis transformation aligns the detected lane lines with the lane boundary geometry with respect to the x-axis. The search for a y-axis transformation aligns the detected lane lines with the lane boundary geometry with respect to the y-axis. Because a search for translational transformations involves searches in two axes (instead of three axes), the search for translational transformations can be performed with quadratic time complexity.

Figure 2:
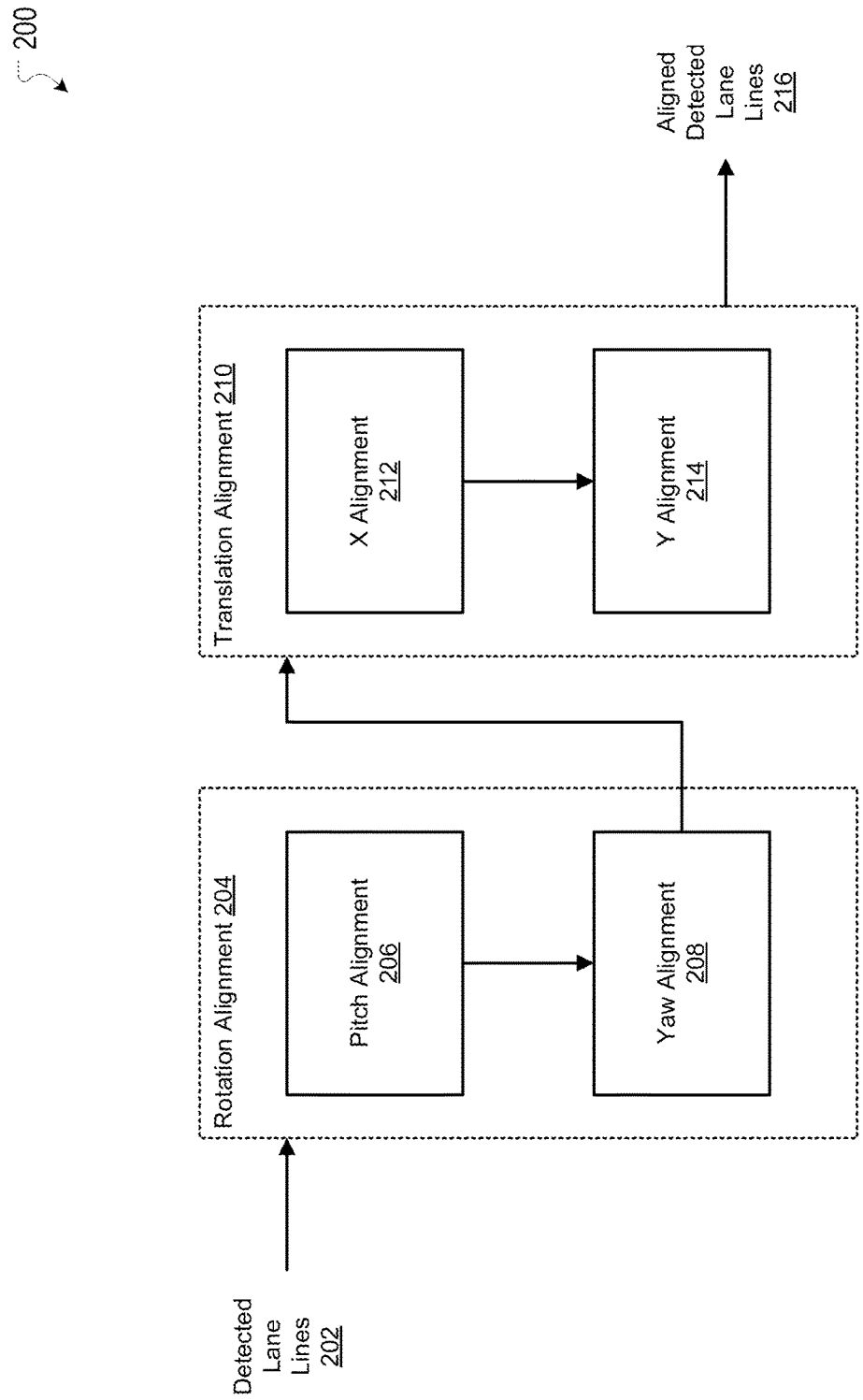
FIG. 2 illustrates an example block diagram associated with visual geometry localization, according to some embodiments of the present technology.

FIG. 2 illustrates an example block diagram 200 associated with aligning detected lane lines (or lane line detections) with lane boundary line geometry, according to some embodiments of the present technology. The aligning of the detected lane lines with the lane boundary line geometry can be performed by, for example, the visual geometry localizer 110 of FIG. 1. It should be understood that there can be additional, fewer, or alternative steps performed in similar or alternative orders, or in parallel, based on the various features and embodiments discussed herein unless otherwise stated.

As illustrated in FIG. 2, detected lane lines 202 can be provided for alignment based on certain rotational transformations and translational transformations. The detected lane lines 202 can undergo rotation alignment 204 based on rotational transformations to align the detected lane lines 202 with lane boundary line geometry with respect to rotation (e.g., angle). The rotation alignment 204 can include pitch alignment 206. The pitch alignment 206 can align the detected lane lines 202 with the lane boundary line geometry with respect to pitch based on a search for pitch transformations. The rotation alignment 204 can include yaw alignment 208. The yaw alignment 208 can align the detected lane lines 202 with the lane boundary line geometry with respect to yaw based on a yaw transformation determined based on a pitch transformation applied in the pitch alignment 206. The detected lane lines 202 can undergo translation alignment 210 based on translational transformations to align the detected lane lines 202 with the lane boundary line geometry with respect to translation (e.g., offset). The translation alignment 210 can include x alignment 212. The x alignment 212 can align the detected lane lines 202 with the lane boundary line geometry with respect to an x-axis based on a search for x-axis transformations. The translation alignment 210 can include y alignment 214. They alignment 214 can align the detected lane lines 202 with the lane boundary line geometry with respect to a y-axis based on a search for y-axis transformations. Aligned detected lane lines 216 can be produced by applying the rotation alignment 204 and the translation alignment 210 to the detected lane lines 202. Accordingly, alignment of detected lane lines 202 with lane boundary line geometry, and ultimate determinations of vehicle localization, in accordance with the present technology can be achieved without rotational transformations and translational transformations in all six degrees of freedom. In some embodiments, transformations associated with certain degrees of freedom (e.g., roll transformations, z-axis transformations) do not need to be performed. In some embodiments, roll transformations and z-axis transformations are not performed. As illustrated in this example, alignment of detected lane lines with lane boundary line geometry can be advantageously performed based on a linear time complexity search and a quadratic time complexity search that are more efficient than a search for transformations involving six degrees of freedom, which undesirably would have $n^6$ time complexity.

Figure 3A:
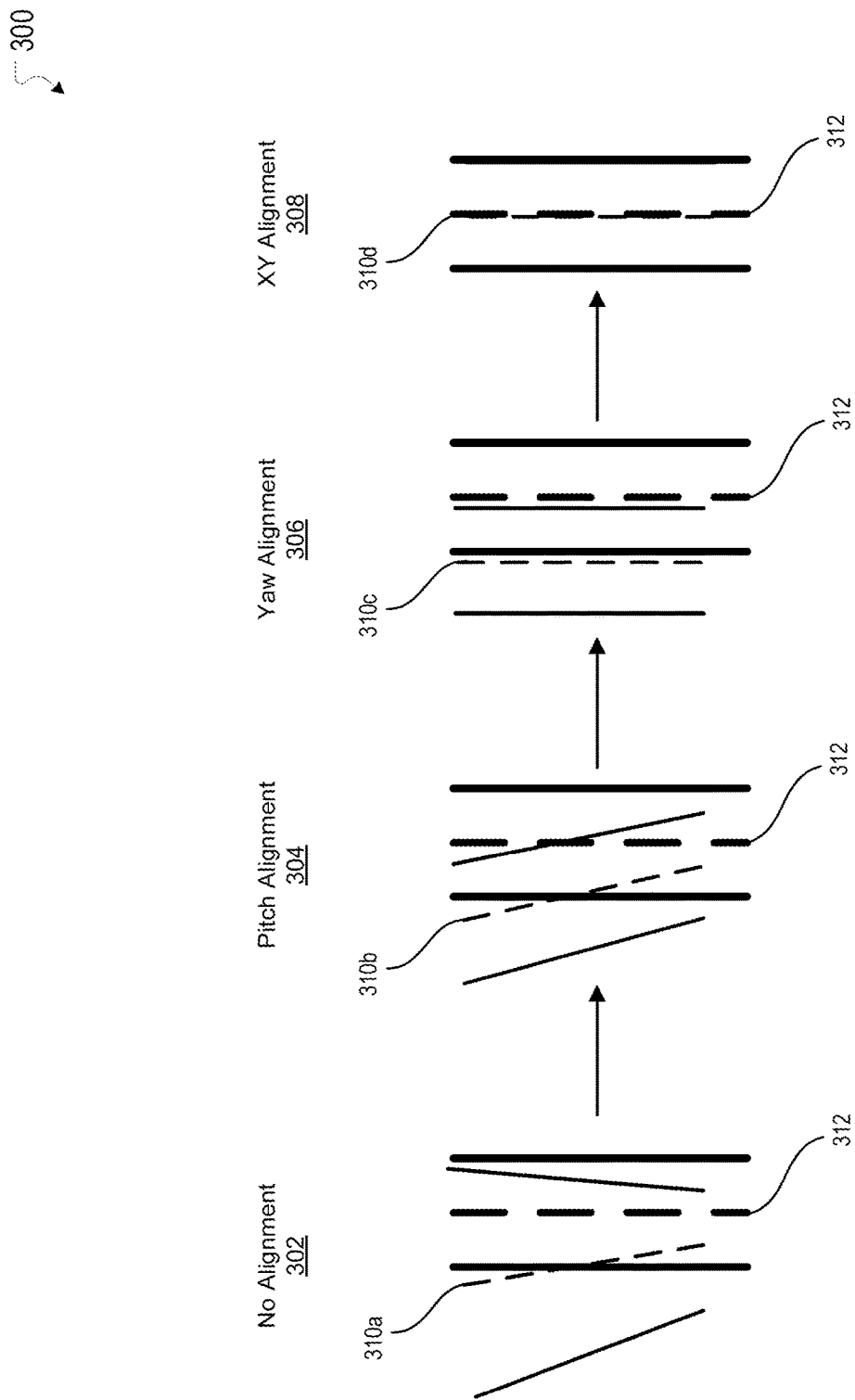
FIGS. 3A-3B illustrate examples associated with visual geometry localization, according to some embodiments of the present technology.

FIG. 3A illustrates an example 300 associated with aligning detected lane lines (or lane line detections) with lane boundary line geometry, according to some embodiments of the present technology. The aligning of the detected lane lines with the lane boundary line geometry can be performed by, for example, the visual geometry localizer 110 of FIG. 1. It should be understood that there can be additional, fewer, or alternative steps performed in similar or alternative orders, or in parallel, based on the various features and embodiments discussed herein unless otherwise stated.

As illustrated in FIG. 3A, in a first stage with no alignment 302, detected lane lines 310a can be projected on lane boundary line geometry 312 without alignment. With no alignment 302, the detected lane lines 310a reflect the shape and orientation of the detected lane lines 310a as they are determined from sensor data of a perception system. In a second stage with pitch alignment 304, detected lane lines 310b aligned with respect to pitch can be projected on the lane boundary line geometry 312. The detected lane lines 310b can be the detected lane lines 310a aligned with respect to pitch. With pitch alignment 304, the detected lane lines 310b have been aligned such that they are parallel with each other. The detected lane lines 310b have a consistent angle difference with low variance with the lane boundary line geometry 312. In a third stage with yaw alignment 306, detected lane lines 310c aligned with respect to yaw can be projected on the lane boundary line geometry 312. The detected lane lines 310c can be the detected lane lines 310b aligned with respect to yaw. With yaw alignment 306, the detected lane lines 310c are parallel with the lane boundary line geometry 312. In a fourth stage with XY alignment 308, detected lane lines 310d aligned with respect to an x-axis and a y-axis can be projected on the lane boundary line geometry 312. The detected lane lines 310d can be the detected lane lines 310c aligned with respect to the x-axis and the y-axis. With XY alignment 308, the detected lane lines 310d are aligned with the lane boundary line geometry 312. The detected lane lines 310d as aligned can be used for visual geometry localization.

In FIG. 1, the visual geometry localizer 110 can generate a grid map based on lane boundary line geometry. The grid map can be used to determine a degree to which detected lane lines align with the lane boundary line geometry and to generate a score for the alignment accordingly. The grid map can include information associated with location of lane boundaries and types of lane boundaries (e.g., dotted line, dashed line, solid line). The grid map can include a grid with a plurality of cells, with each cell in the grid corresponding with a portion of the lane boundary line geometry. The portion can be any suitable selected value of area (e.g., 10 cm$^2$). Each cell in the grid can be assigned a value based on whether the corresponding portion of the lane boundary line geometry includes a lane boundary line, is adjacent to a lane boundary line, or does not include a lane boundary line. The value assigned to a cell that corresponds with a portion of the lane boundary line geometry that includes a lane boundary line can be higher than the value assigned to a cell that corresponds with a portion of the lane boundary line geometry that is adjacent to a lane boundary line or does not include a lane boundary line. The value assigned to a cell that corresponds with a portion of the lane boundary line geometry that is adjacent to a lane boundary line can be higher than the value assigned to a cell that does not include a lane boundary line. As just one example, a grid map generated from a lane boundary line geometry can include a grid where cells that correspond with portions of the lane boundary line geometry that include a lane boundary line can be assigned a value of 2, In this example, cells that correspond with portions of the lane boundary line geometry that are adjacent to a lane boundary line can be assigned a value of 1. Further, in this example, cells that correspond with portions of the lane boundary line geometry that do not include a lane boundary line can be assigned a value of 0. Many variations are possible.

Figure 3B:
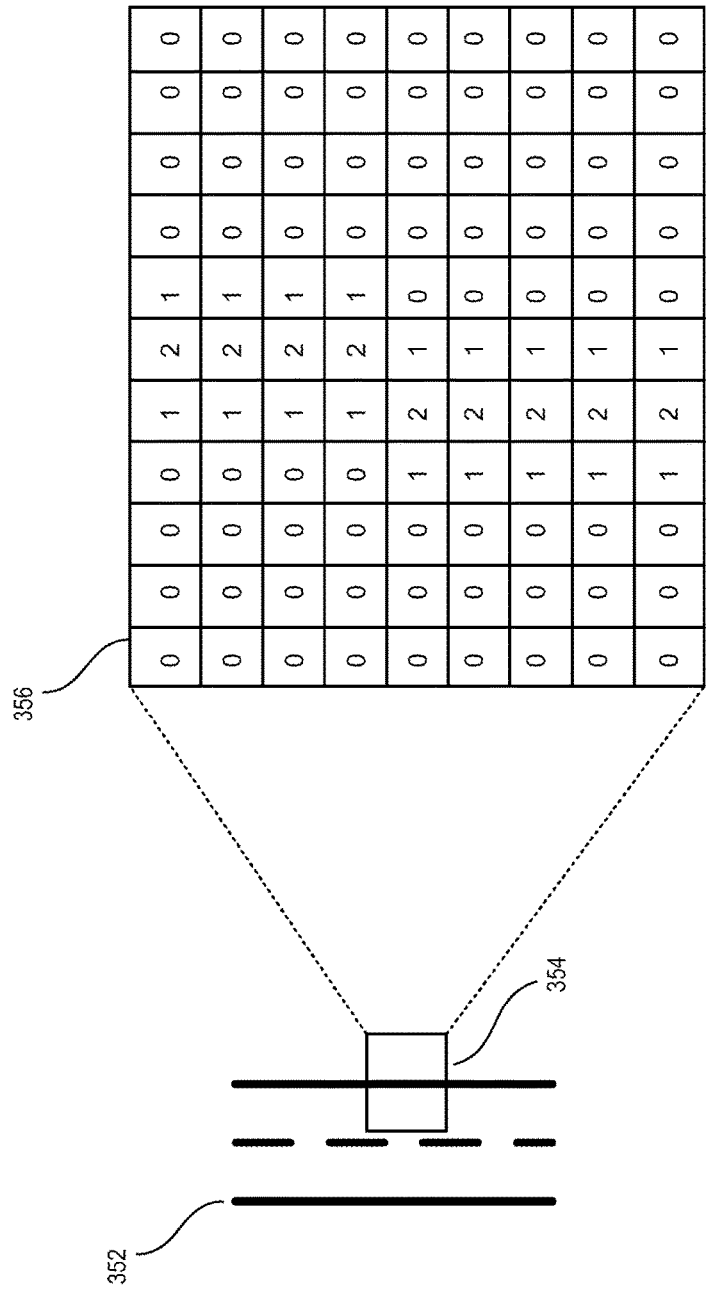

FIG. 3B illustrates an example 350 associated with generating a grid map based on lane boundary line geometry, according to some embodiments of the present technology. The grid map can be generated, for example, by the visual geometry localizer 110 of FIG. 1. It should be understood that there can be additional, fewer, or alternative steps performed in similar or alternative orders, or in parallel, based on the various features and embodiments discussed herein unless otherwise stated.

As illustrated in FIG. 3B, the example 350 is associated with a road segment 352 with two lanes. A grid map can be generated based on lane boundary line geometry associated with the road segment 352. In this example, the grid map includes a grid 356 corresponding with the lane boundary line geometry associated with a section 354 of the road segment 352. The grid 356 is a blown up representation of the grid map corresponding with the section 354. In the grid 356, each cell corresponds with a portion of the lane boundary line geometry associated with the section 354. In the grid 356, each cell that corresponds with a portion of the lane boundary line geometry that includes a lane boundary line is assigned a value of 2. Each cell that corresponds with a portion of the lane boundary line geometry that is adjacent to a lane boundary line is assigned a value of 1. Each cell that corresponds with a portion of the lane boundary line geometry that does not include a lane boundary line is assigned a value of 0. Thus, as illustrated in FIG. 3B, the grid 356 includes cells assigned a value of 2 that correspond with where the lane boundary line in the section 354 is located. The grid 356 includes cells assigned a value of 1 that are adjacent to the cells that correspond with where the lane boundary line in the section 354 is located. The other cells in the grid 356, which are assigned a value of 0, do not correspond with where the lane boundary line in the section 354 is located and are not adjacent to the cells that correspond with where the lane boundary line in the section 354 is located. Many variations are possible.

In FIG. 1, the visual geometry localizer 110 can generate a score for detected lane lines based on a degree to which the detected lane lines match or align with lane boundary line geometry. The score can be a basis for whether to use the detected lane lines to determine a pose of a vehicle based on the detected lane lines. In various embodiments, the visual geometry localizer 110 can generate an aligning score for detected lane lines by overlaying the detected lane lines over a grid map generated from lane boundary line geometry with which the detected lane lines are to be aligned. The aligning score for the detected lane lines can be based on a sum of values of cells in the grid map corresponding with where the detected lane lines are overlaid. In some embodiments, the values of the cells can be weighted based on a type of detected lane line and a type of a lane boundary line corresponding with the cells. Where the type of the detected lane line and the type of the lane boundary line are different, the value of the cells corresponding with where the detected lane line is overlaid can be discounted in value. Where the type of the detected lane line and the type of the lane boundary line are of the same type, the value of the cells corresponding with where the detected lane line is overlaid can retain full value.

For example, detected lane lines of a road segment can be overlaid on a grid map generated from lane boundary line geometry associated with the road segment. The grid map can include a grid of cells with cell values of 2 where the cells include a lane boundary line, cell values of 1 where the cells are adjacent to a lane boundary line, and cell values of 0 where the cells do not include a lane boundary line. In this example, a detected lane line of a dashed line type can overlay cells with values of 2 and 1 indicating that the detected lane line to some degree is aligned with a lane boundary line. The lane boundary line can be of a solid line type. Because the type of the detected lane line and the type of the lane boundary line are different, the values of the cells on which the detected lane line is overlaid can be discounted to reflect the difference in line types. The cell values can be discounted in various manners and by different amounts. For example, in one implementation, the cell values can be weighted by 0.7. A sum of the values of cells on which the detected lane lines are overlaid can be the aligning score for the detected lane lines. Many variations are possible.

The visual geometry localizer 110 can determine a pose based on aligned, detected lane lines. The pose can be an optimal pose (or precise pose) and provide sufficient precision to determine a lane in which a vehicle is located (e.g., lane-level precision). For example, the optimal pose, in some cases, can provide precision within 3 centimeters. In various embodiments, the visual geometry localizer 110 can receive multiple sets of detected lane lines associated with an environment. Each set of detected lane lines can be scored based on a degree to which the set of detected lane lines match or align with lane boundary line geometry associated with the environment. Based on the scores, a threshold number (e.g., top 10) of sets of detected lane lines can be determined. The visual geometry localizer 110 can determine a pose based on each set of detected lane lines using visual geometry localization. A pose can be determined for a set of detected lane lines by estimating a position and an orientation of a camera that captured image data from which the set of detected lane lines were generated. The pose, which indicates the position and the orientation of the vehicle, can be based on the position and the orientation of the camera adjusted by the location and the direction of the camera relative to the vehicle.

In various embodiments, the visual geometry localizer 110 can determine an optimal pose (or precise pose) from a set of poses determined from sets of detected lane lines based on a trajectory and a prior pose. The optimal pose can be determined from the set of poses based on which pose keeps the trajectory smooth. For example, the optimal pose can be a pose that best aligns with the trajectory, is closest to the trajectory, or is within a threshold proximity of the trajectory. In some cases, the optimal pose can be determined based on which pose from the set of poses more closely corresponds with an estimated pose determined from the trajectory and the prior pose. For example, a vehicle can be navigating in an environment with a trajectory associated with straight forward longitudinal travel. A pose can be determined for the vehicle while the vehicle is navigating the environment. Subsequently, based on the trajectory of the vehicle, an estimated pose can be determined based on the pose and the trajectory. A set of poses can be determined based on a set of detected lane lines that most closely match lane boundary line geometry associated with the environment. An optimal pose can be determined from the set of poses based on which pose of the set of poses is closest to the estimated pose. Many variations are possible.

In various embodiments, the modules illustrated in the example system 100 of FIG. 1 can operate in parallel at different frequencies as appropriate. For example, the pre-loader 104 and the local geometry loader 102 can provide an HD map and local geometry on an as needed basis. The visual geometry localization module 108 and the visual geometry localizer 110 can operate at regular intervals (e.g., 10 Hz) to provide regular updates for pose of a vehicle. It should be understood that the steps discussed herein can be performed repeatedly to provide a sequence of poses. Trajectories can be determined from the sequence of poses to inform control and navigation of the vehicle. Many variations are possible.

Figure 4:
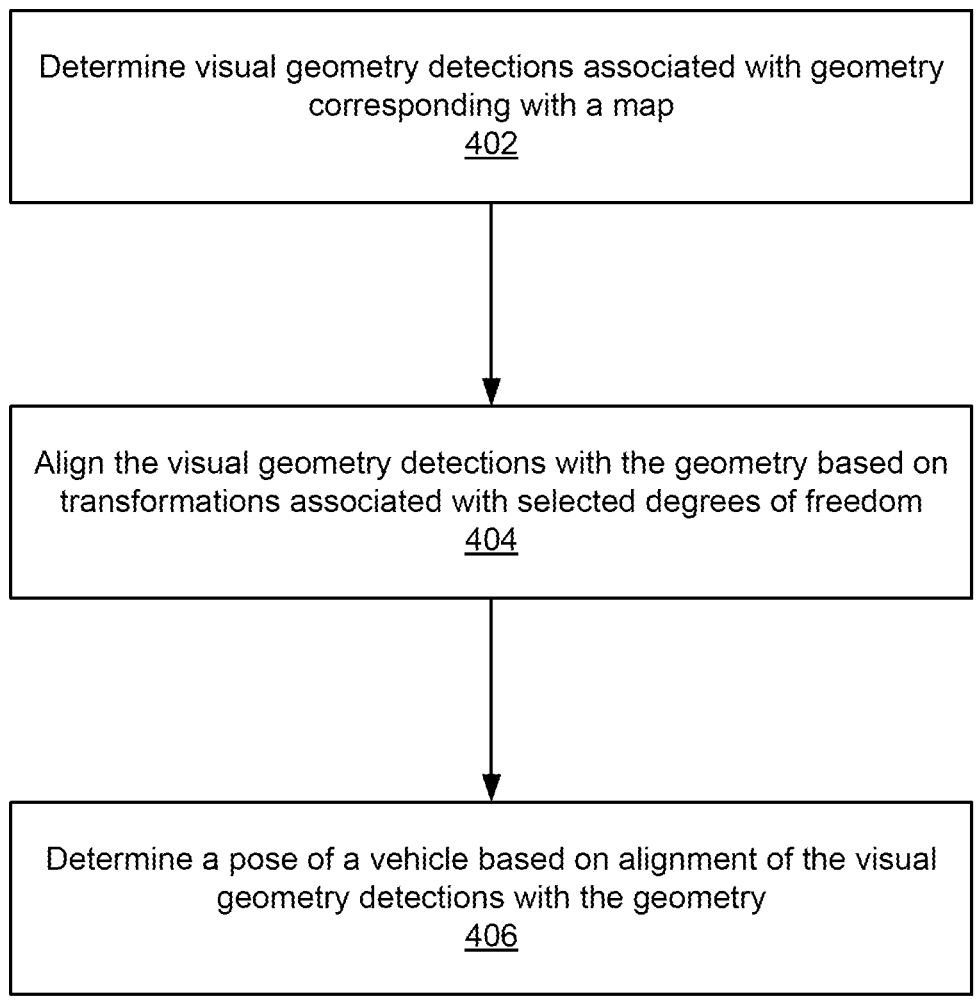
FIG. 4 illustrates an example method, according to some embodiments of the present technology.

FIG. 4 illustrates an example method 400, according to some embodiments of the present technology. The example method 400 can be applied to various aspects of visual geometry localization. For example, the example method 400 can be applied to determining a pose based on visual geometry detections, such as detected lane lines (or lane line detections) and local geometry, such as lane boundary line geometry. At block 402, the example method 400 determines visual geometry detections associated with geometry corresponding with a map. At block 404, the example method 400 aligns the visual geometry detections with the geometry based on transformations associated with selected degrees of freedom. At block 406, the example method 400 determines a pose of a vehicle based on alignment of the visual geometry detections with the geometry. Many variations to the example method are possible. It should be appreciated that there can be additional, fewer, or alternative steps performed in similar or alternative orders, or in parallel, within the scope of the various embodiments discussed herein unless otherwise stated.

MULTI-MODE VISUAL GEOMETRY LOCALIZATION

As referenced, autonomous systems of vehicles rely on localization for various functions, such as path planning and safe navigation. With localization, an autonomous system can accurately determine where a vehicle is located. Based on accurate determination of vehicle location, the autonomous system can, for example, plan a path that safely navigates the vehicle through an environment. As discussed, visual geometry localization can provide precise localization, allowing the autonomous system to have an accurate determination of where the vehicle is located and safely navigate the vehicle. However, technological challenges in visual geometry localization can arise in situations where discrepancies exist between a high definition (HD) map of an environment and the environment itself.

Various circumstances can cause discrepancies to exist between an HD map of an environment and the environment itself. One circumstance is that, if an environment has changed since it was last mapped, an HD map of the environment created before the change would not reflect the change. For example, an HD map of a road can indicate that the road has three lanes. Through road reconfiguration, the road can later be repainted to have four lanes instead of the original three lanes. Until the HD map of the road is updated to reflect the repainting, a discrepancy will exist between the HD map of the road and the road itself. Where discrepancies exist between an HD map of an environment and the environment itself, image data of the environment may not properly align with the HD map of the environment. Due to the lack of alignment between the image data of the environment and the HD map of the environment, visual geometry localization may generate erroneous results. For example, a vehicle can navigate a road that was recently repainted to have four lanes instead of three lanes. An HD map of the road may not reflect the recent repainting and indicate that the road has three lanes. The vehicle can capture image data of the road. The captured image data can indicate that the road has four lanes. Accordingly, the captured image data, which indicates the road has four lanes, cannot correctly align with the HD map, which indicates the road has three lanes. Visual geometry localization based on the captured image data and the HD map in this example can generate an incorrect pose for the vehicle because the captured image data and the HD map do not correctly align. Thus, visual geometry localization for autonomous systems can be associated with technological challenges in various circumstances.

The present technology provides for improved approaches to visual geometry localization. In various embodiments, multiple localization results can be generated based on visual geometry localization. A first localization result can be a global result pose. The global result pose, as one type of pose, can be generated by visual geometry localization based on a global search of an HD map. The global search can encompass a wide lateral range. For example, the global search can include an entire road. A second localization result can be a local result pose. The local result pose, as another type of pose, can be generated by visual geometry localization based on a local search of a portion (or segment) of the HD map. The local search can be restricted to a narrow lateral range. For example, the local search can be restricted to a current lane. This prevents the local result pose from jumping and maintains smooth poses. The global result pose and the local result pose can be compared to determine a mode of operation for determining a pose of a vehicle based on either the global result pose or the local result pose. In a first mode of operation (e.g., normal mode, smooth mode), the pose of the vehicle is determined based on the local result pose. A fusion result pose can be determined based on a fusion of the local result pose and results from other localization processes (e.g., GPS localization, LiDAR localization). The fusion result pose can be provided as the pose of the vehicle. In the first mode of operation, if the global result pose and the local result pose consistently deviate from each other (e.g., are a threshold distance away from each other for a threshold period of time), then operation can be switched to a second mode of operation (e.g., re-localization mode, correction mode). In the second mode of operation, the pose of the vehicle is determined based on the global result pose. A fusion result pose is determined based on a fusion of the global result pose and the results from other localization processes. The fusion result pose can be provided as the pose of the vehicle. In the second mode of operation, if the global result pose converges with the fusion result pose (e.g., are within a threshold distance from each other for a threshold period of time), then operation can switch to the first mode of operation. In various embodiments, path planning can operate based on a mode of operation associated with determining a pose of a vehicle. In normal mode, a local result pose is trusted for localization. The pose of the vehicle is determined based on a fusion result pose (e.g., determined by a localization fusion module) involving the local result pose, the path planning can follow a driving path (e.g., preplanned path) in an HD map. In re-localization mode, there is a consistent difference between a local result pose and a global result pose, and the global result pose is trusted for localization. The pose of the vehicle is determined based on a fusion result pose (e.g., determined by a localization fusion module) involving the global result pose, the path planning can follow a lane tracking path.

As an illustrative example, a vehicle can navigate an environment that includes a road. An autonomous system on the vehicle can capture image data through various sensors (e.g., cameras) on the vehicle. Visual geometry localization can be performed based on the captured image data and an HD map of the environment. The visual geometry localization can generate a global result pose and a local result pose. The global result pose can be a first localization result determined by a global search based on the captured image data applied to the entire environment, including the road, in the HD map. The local result pose can be a second localization result determined by a local search based on the captured image data applied to a lane of the road in the HD map. In this example, a pose determined by the global search can be anywhere on the road. A pose determined by the local search can be anywhere in the lane. A mode of operation can be determined based on the global result pose and the local result pose. In normal mode, the autonomous system determines a fusion result pose based on a fusion of the local result pose and results from other localization processes. The autonomous system determines a pose of the vehicle based on the fusion result pose. In normal mode, the autonomous system plans a path for the vehicle based on a driving path in the HD map and the pose of the vehicle. In this example, operation in normal mode indicates that the HD map is consistent with the environment and can be relied on for visual geometry localization. Further, in this example, the mode of operation can switch to re-localization mode when the global result pose and the local result pose are a threshold distance away from each other for a threshold period of time. In re-localization mode, the autonomous system determines a fusion result pose based on a fusion of the global result pose and results from other localization processes. The autonomous system determines a pose of the vehicle based on the fusion result pose. In re-localization mode, the autonomous system plans a path for the vehicle based on a lane tracking path. Operation in re-localization mode indicates that the HD map, or the local result pose, cannot be relied upon for visual geometry localization. Further, in this example, the mode of operation can switch to normal mode when the global result pose and the fusion result pose are within a threshold distance from each other for a threshold period of time. These and other inventive features and related advantages of the various embodiments of the present technology are discussed in more detail herein.

Figure 5:
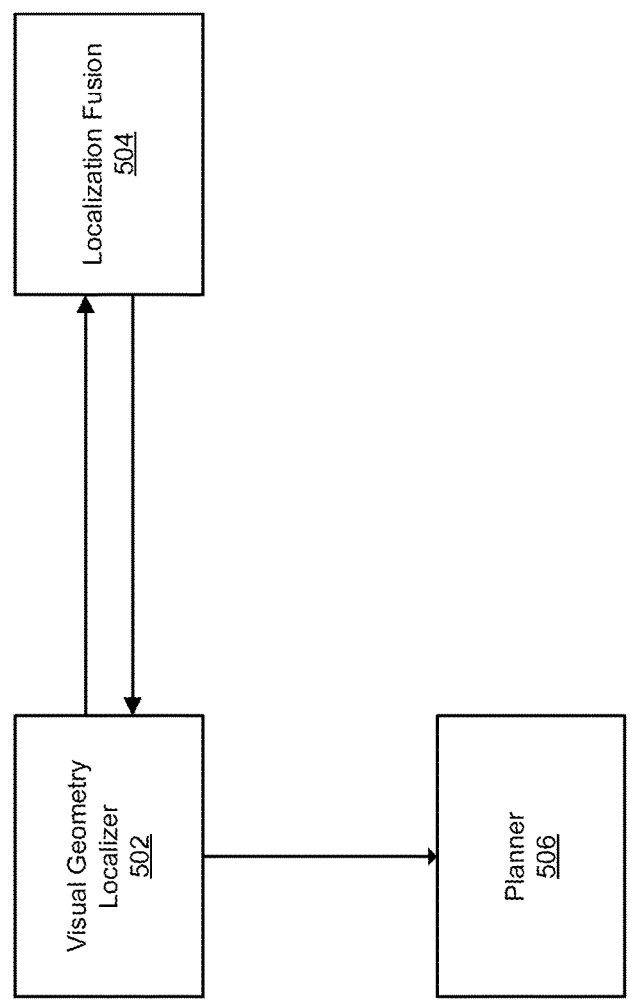
FIG. 5 illustrates an example system, according to some embodiments of the present technology.

FIG. 5 illustrates an example system 500 including a visual geometry localizer 502, a localization fusion 504, and a planner 506, according to some embodiments of the present technology. In some embodiments, some or all of the functionality performed by the example system 500 may be performed by one or more computing systems implemented in any type of vehicle, such as an autonomous vehicle as further discussed herein. In some embodiments, some or all of the functionality performed by the example system 500 may be performed by one or more backend computing systems. In some embodiments, some or all of the functionality performed by the example system 500 may be performed by one or more computing systems associated with (e.g., carried by) one or more users riding in a vehicle. In some embodiments, some or all data processed and/or stored by the example system 500 can be stored in a data store (e.g., local to the example system 500) or other storage system (e.g., cloud storage remote from the example system 500). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the example system 500 can be implemented in any suitable combinations.

In FIG. 5, the localization fusion 504 can generate a fusion result pose based on multiple localization results from different localization processes. In various embodiments, the localization fusion 504 can receive localization results from a variety of localization processes, such as a visual geometry localization process, a GPS localization process, a LiDAR localization process, and an IMU localization process. The localization results from the different localization processes can be weighted based on associated confidences. For example, a localization result from a LiDAR localization process when an environment is experiencing rain, snow, fog, or other inclement weather conditions can have reduced accuracy. In these instances, the localization result from the LiDAR localization process can be discounted or weighted less than other localization results. The localization results can be filtered based on concurrence with other localization results. For example, a localization result that is a threshold difference away from other localization results that are within a threshold distance of each other can be filtered or otherwise disregarded. The weighted and filtered localization results can be combined to determine a fusion result pose. The fusion result pose can represent an aggregated localization result based on the localization results from the different localization processes. A pose can be determined based on the fusion result pose. Many variations are possible.

The visual geometry localizer 502 can generate a localization result based on visual geometry localization. In various embodiments, the visual geometry localizer 502 can generate a global result pose by visual geometry localization based on a global search of an HD map. The global search of the HD map can involve capturing image data of an environment corresponding with the HD map. The HD map is searched for a position and orientation that would allow a camera to capture the captured image data. The global result pose can be determined based on the position and the orientation. Because the global search involves searching throughout the HD map, the position and the orientation on which the global result pose is based can be located anywhere in the HD map. For example, a visual geometry localizer of a vehicle can perform a global search of an HD map of an environment including a road based on image data captured at the road. If the road has, for example, four lanes, the global search can search all four lanes for a position and an orientation that would allow a camera to capture the captured image data. The global search can generate a global result pose that indicates the vehicle is in, for example, the leftmost lane of the four lanes.

In various embodiments, the visual geometry localizer 502 can generate a local result pose by visual geometry localization based on a local search of an HD map. The local search of the HD map can be limited to a portion of the HD map, such as one lane of a road represented in the HD map. The portion of the HD map can be based on a current pose or a prior pose of the vehicle. The local search can involve capturing image data of an environment corresponding with the HD map. The portion of the HD map is searched for a position and orientation that would allow a camera to capture the captured image data. The local result pose can be determined based on the position and the orientation. Because the local search involves searching a portion of the HD map, the position and the orientation on which the local result pose is based is limited to the portion of the HD map. For example, a visual geometry localizer of a vehicle can perform a local search of an HD map of a road based on image data captured at the road. The road can, for example, have three lanes. In this example, if the vehicle was previously determined to be in the middle lane, the local search can, therefore, search the middle lane for a position and an orientation that would allow a camera to capture the captured image data. The local search can generate a local result pose that indicates where the vehicle is in the middle lane.

In various embodiments, a mode of operation (e.g., normal mode, re-localization mode) can be determined based on a global result pose and a local result pose generated by the visual geometry localizer 502. In various embodiments, normal mode can be a default mode of operation. In normal mode, the visual geometry localizer 502 provides the local result pose to localization fusion 504. Thus, the localization fusion 504 determines a fusion result pose based on the local result pose generated by the visual geometry localizer 502 and localization results from other localization processes. Operation in normal mode indicates that an HD map on which the local result pose and the global result pose are based is reliable. The fusion result pose determined based on the local result pose can be smoother (e.g., experience less variance) than a fusion result pose determined based on the global result pose. In normal mode, the local result pose and the global result pose are compared to determine a difference or deviation between the local result pose and the global result pose. If the local result pose and the global result pose do not consistently deviate (e.g., are within a threshold distance of each other with variance within a threshold variance), then the mode of operation remains in normal mode. If the local result pose and the global result pose consistently deviate with a stable bias (e.g., are a threshold distance away from each other for a threshold period of time), then the mode of operation switches to re-localization mode. As just one example, a local result pose and a global result pose can consistently deviate with a stable bias if the local result pose and the global result pose are at least 1.5 meters apart (or half a lane width) for at least 10 seconds. In other implementations, other threshold distances and other threshold periods of time can be used. In re-localization mode, the visual geometry localizer 502 provides the global result pose to localization fusion 504. The localization fusion 504 determines a fusion result pose based on the global result pose generated by the visual geometry localizer 502 and localization results from other localization processes. Operation in re-localization mode indicates that the local result pose may be incorrect due to, for example, a lack of updates to an HD map on which the local result pose and the global result pose are based. In re-localization mode, the global result pose and the fusion result pose are compared to determine whether the global result pose and the fusion result pose are converging (e.g., are within a threshold distance of each other for a threshold period of time). If the global result pose and the fusion result pose are converging, then the mode of operation switches to normal mode. If the global result pose and the fusion result pose are not converging (e.g., are a threshold distance away from each other), then the mode of operation remains in re-localization mode. Many variations are possible.

The planner 506 can generate a path for a vehicle to follow. In various embodiments, the planner 506 can generate a path based on a mode of operation (e.g., normal mode, re-localization mode). In normal mode, the planner 506 can generate a path based on a driving path in an HD map of an environment. The driving path in the HD map can be a stored path that navigates the environment in a preplanned manner. The driving path can, for example, cross lanes in anticipation of an upcoming turn. Operation in normal mode can be based on a determination that information in the HD map is reliable (e.g., the environment has not changed since the HD map was generated) and, accordingly, the driving path in the HD map is safe to follow. The planner 506 can generate the path to follow the driving path while accounting for real-time conditions (e.g., weather, road hazards) and road objects (e.g., other vehicles). For example, a driving path in an HD map can include a preplanned route from a start location to a destination location that abides by various rules and regulations associated with driving a truck (e.g., a heavy truck with a trailer). The driving path can route through certain lanes in accordance with the various rules and regulations. A planner operating in normal mode can generate a path for a truck that follows the driving path. In re-localization mode, the planner 506 can generate a path based on lane tracking. The lane tracking can involve determining where lane boundaries are for a lane in which a vehicle is located and generating a path that remains within the lane boundaries. Operation in re-localization mode can be based on a determination that information in an HD map of an environment may be unreliable (e.g., the environment has changed since the HD map was generated) and, accordingly, a driving path in the HD map may not be safe to follow. The planner 506 can generate the path that remains within lane boundaries while accounting for real-time conditions (e.g., weather, road hazards) and other objects (e.g., other vehicles). For example, a planner operating in re-localization mode can generate a path for a vehicle that maintains the vehicle travelling in its current lane. The planner can adjust speed as appropriate in response to other vehicles in the lane. Many variations are possible.

Figure 6:
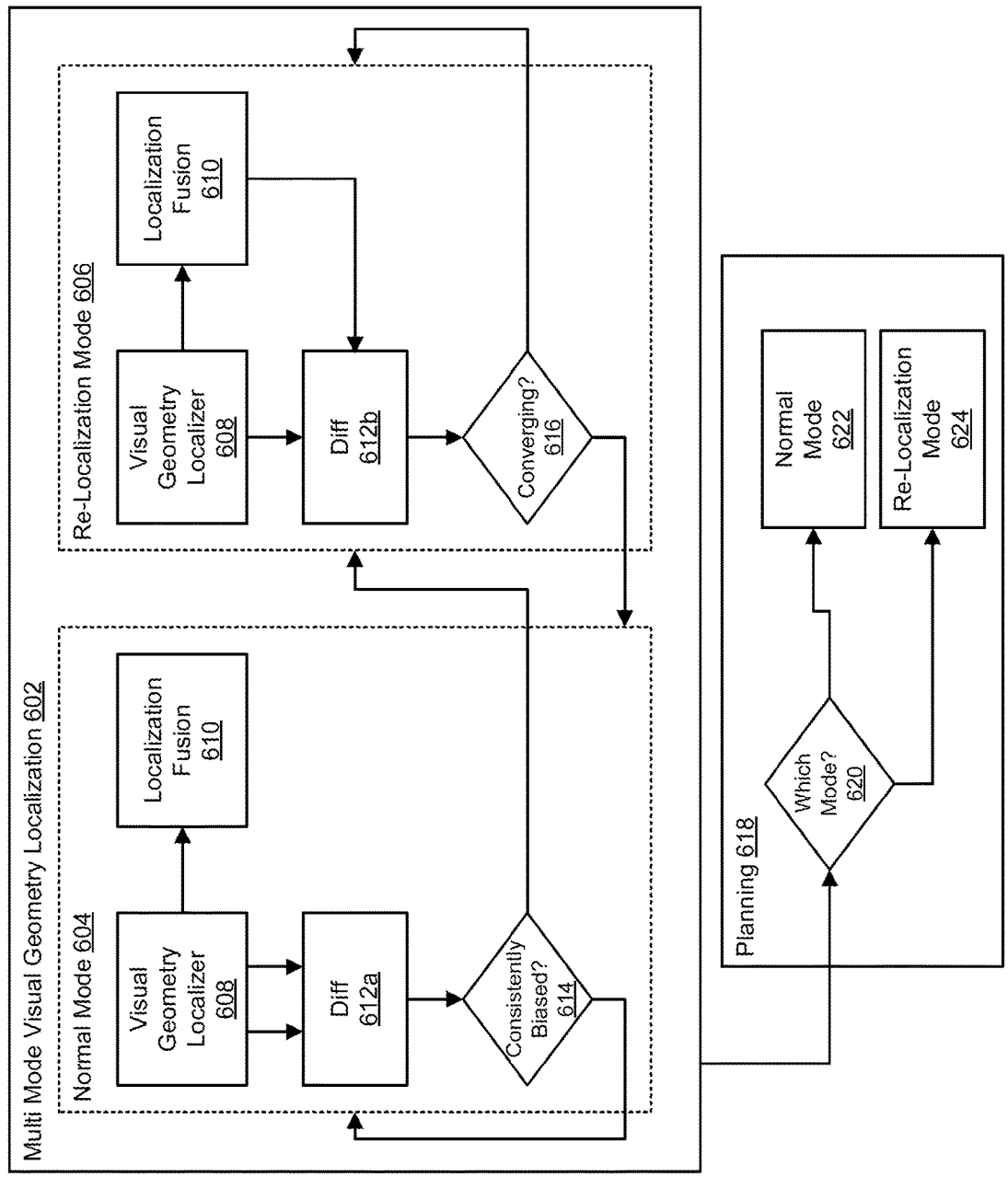
FIG. 6 illustrates an example block diagram associated with multi-mode visual geometry localization, according to some embodiments of the present technology.

FIG. 6 illustrates an example block diagram 600 associated with multi-mode visual geometry localization, according to some embodiments of the present technology. The multi-mode visual geometry localization can be performed by, for example, the system 500 of FIG. 5. It should be understood that there can be additional, fewer, or alternative steps performed in similar or alternative orders, or in parallel, based on the various features and embodiments discussed herein unless otherwise stated.

As illustrated in FIG. 6, multi-mode visual geometry localization 602 includes two modes of operation—normal mode 604 and re-localization mode 606. In normal mode 604, visual geometry localizer 608 can provide a local result pose to localization fusion 610. The localization fusion 610 can generate a fusion result pose based on the local result pose and localization results from other localization processes. In normal mode 604, the visual geometry localizer 608 can provide a local result pose and a global result pose to a difference calculator 612a. The difference calculator 612a can determine a difference or deviation between the local result pose and the global result pose. In normal mode 604, a determination can be made as to whether the difference between the local result pose and the global result pose is consistently biased 614. If the local result pose and the global result pose are not consistently biased, then operation can remain in normal mode 604. If the local result pose and the global result pose are consistently biased, then operation changes to re-localization mode 606.

In re-localization mode 606, the visual geometry localizer 608 can provide the global result pose to the localization fusion 610. The localization fusion 610 can generate a fusion result pose based on the global result pose and localization results from other localization processes. In re-localization mode 606, the global result pose and the fusion result pose can be provided to a difference calculator 612b. The difference calculator 612b can determine a difference or deviation between the global result pose and the fusion result pose. In re-localization mode 606, a determination can be made as to whether the global result pose and the fusion result pose are converging 616. If the global result pose and the fusion result pose are not converging, then operation can remain in re-localization mode 606. If the global result pose and the fusion result pose are converging, then operation changes to normal mode 604. As illustrated in FIG. 6, the mode of operation is provided to planning 618. In planning 618, a determination is made as to the mode of operation in which the multi-mode visual geometry localization 602 is operating 620. If the multi-mode visual geometry localization 602 is operating in normal mode 622, then planning 618 can generate a path based on a driving path from an HD map. If the multi-mode visual geometry localization 602 is operating in re-localization mode 624, then planning 618 can generate a path based on lane tracking. Many variations are possible.

Figure 7A:
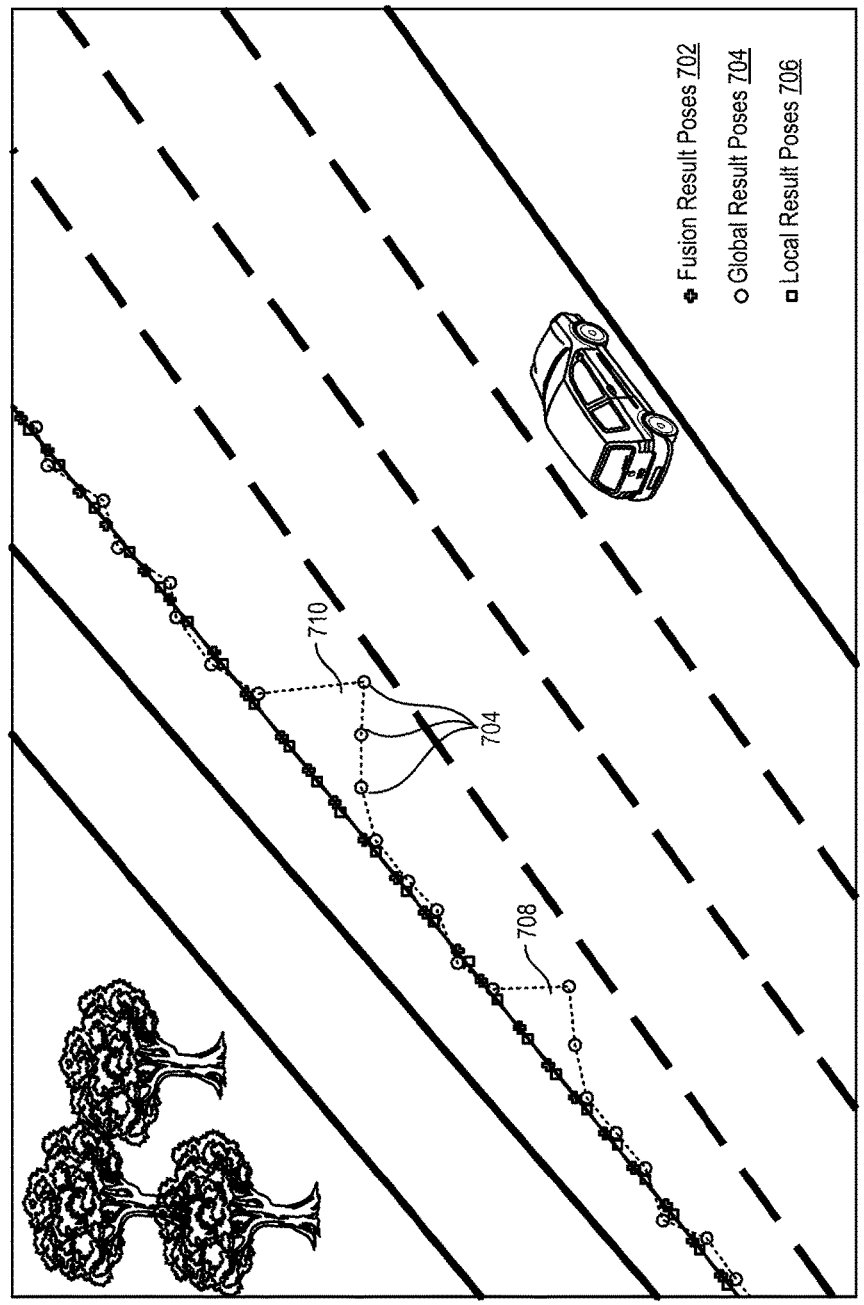
FIGS. 7A-7B illustrate examples associated with multi-mode visual geometry localization, according to some embodiments of the present technology.

FIG. 7A illustrates an example 700 associated with multi-mode visual geometry localization in normal mode, according to some embodiments of the present technology. The multi-mode visual geometry localization in normal mode can be performed by, for example, the system 500 of FIG. 5. It should be understood that there can be additional, fewer, or alternative steps performed in similar or alternative orders, or in parallel, based on the various features and embodiments discussed herein unless otherwise stated.

As illustrated in FIG. 7A, the example 700 depicts three localization paths associated with a path of a vehicle (not shown), such as a truck, on a road. A first localization path can be based on fusion result poses 702 illustrating the path along which the vehicle is travelling according to fusion result poses generated, for example, by the localization fusion 504 of FIG. 5. In this example, multi-mode visual geometry localization is in normal mode. The fusion result poses 702 are generated based on the local result poses 706 and localization results from other localization processes. A second localization path can be based on global result poses 704 illustrating the path on the road the vehicle is travelling along according to global result poses generated, for example, by the visual geometry localizer 502 of FIG. 5. A third localization path can be based on local result poses 706 illustrating the path on the road the vehicle is travelling along according to local result poses generated, for example, by the visual geometry localizer 502 of FIG. 5. The global result poses 704 deviate from the local result poses 706 at point 708 and point 710. In this illustration, the differences between the local result poses 706 and the global result poses 704 at point 708 and point 710 exceed a threshold distance (e.g., 1.5 m, half a lane width). However, the differences between local result poses 706 and the global result poses 704 do not exceed the threshold distance for a threshold period of time (e.g., 10 s). Accordingly, in this example, the local result poses 706 and the global result poses 704 are not consistently deviating from one another with a stable bias. Thus, the multi-mode visual geometry localization remains in normal mode, Many variations are possible.

Figure 7B:
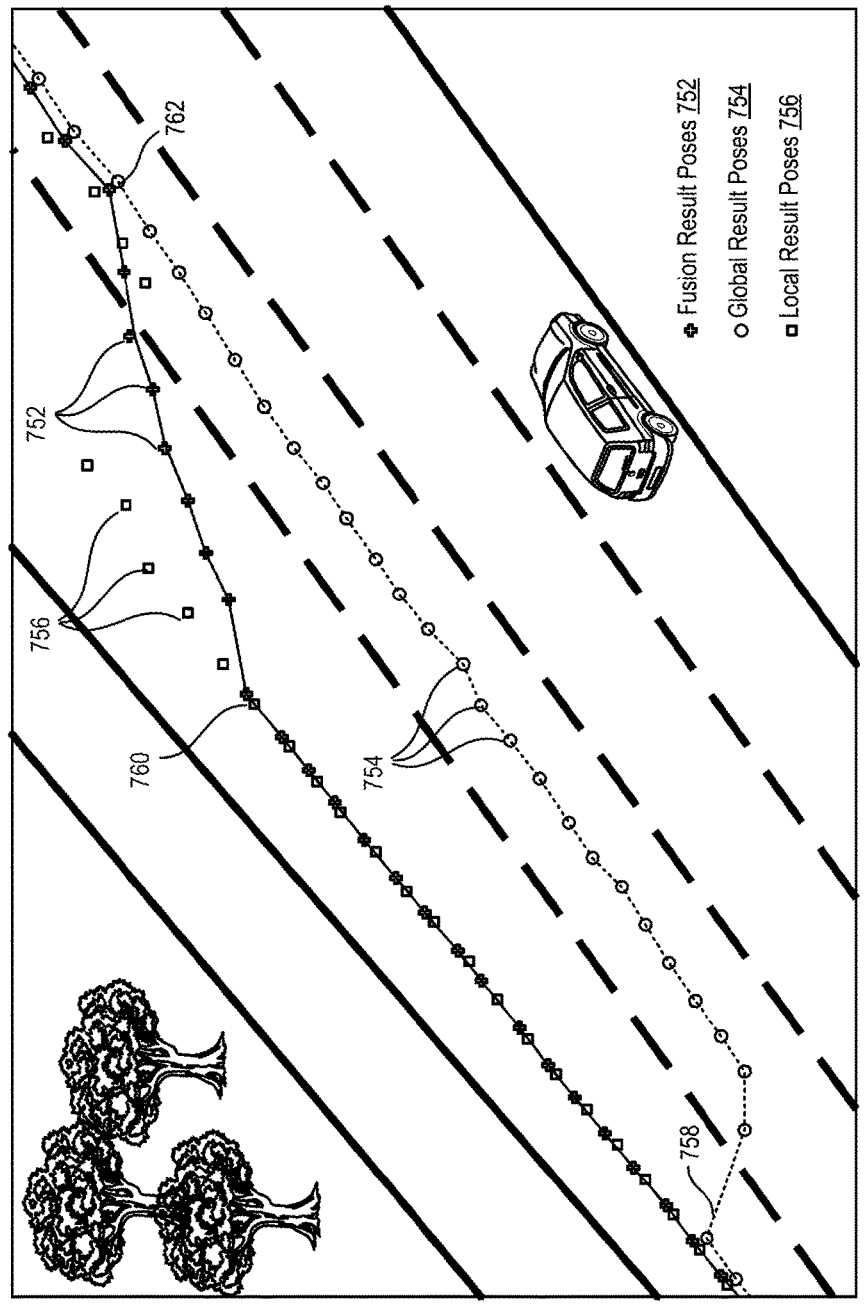

FIG. 7B illustrates an example 750 associated with multi-mode visual geometry localization in re-localization mode, according to some embodiments of the present technology. The multi-mode visual geometry localization in re-localization mode can be performed by, for example, the system 500 of FIG. 5. It should be understood that there can be additional, fewer, or alternative steps performed in similar or alternative orders, or in parallel, based on the various features and embodiments discussed herein unless otherwise stated.

As illustrated in FIG. 7B, the example 750 depicts three localization paths associated with a path of a vehicle (not shown), such as a truck, on a road. A first localization path can be based on fusion result poses 752 illustrating the path on the road the vehicle is travelling along according to fusion result poses generated, for example, by the localization fusion 504 of FIG. 5. In this example, multi-mode visual geometry localization is initially in normal mode. The fusion result poses 752 are generated based on the local result poses 756 and localization results from other localization processes. A second localization path can be based on global result poses 754 illustrating the path the vehicle is travelling on the road according to global result poses generated, for example, by the visual geometry localizer 502 of FIG. 5. A third localization path can be based on local result poses 756 illustrating the path the vehicle is travelling on the road according to local result poses generated, for example, by the visual geometry localizer 502 of FIG. 5. The global result poses 754 begin to deviate from the local result poses 756 at point 758. The differences between the local result poses 756 and the global result poses 754 beginning at point 758 can exceed a threshold distance (e.g., 1.5 m, half a lane width). The differences between local result poses 756 and the global result poses 754 can exceed the threshold distance for a threshold period of time (e.g., 10 s). Accordingly, the local result poses 756 and the global result poses 754 are consistently deviating with a stable bias. Based on the local result poses 756 and the global result poses 754 consistently deviating with a stable bias, the multi-mode visual geometry localization changes to re-localization mode at point 760. In re-localization mode, the fusion result poses 752 are generated based on the global result poses 754 and localization results from other localization processes. From point 760 to point 762, the differences between the global result poses 754 and the fusion result poses 752 gradually reduce. At point 762, the differences between the global result poses 754 and the fusion result poses 752 are within a threshold distance (e.g., within 1.5 m). Assuming the differences between the global result poses 754 and the fusion result poses 752 remain within the threshold distance for a threshold period of time (e.g., 10 s), then the multi-mode visual geometry localization can change to normal mode. Many variations are possible.

Figure 8:
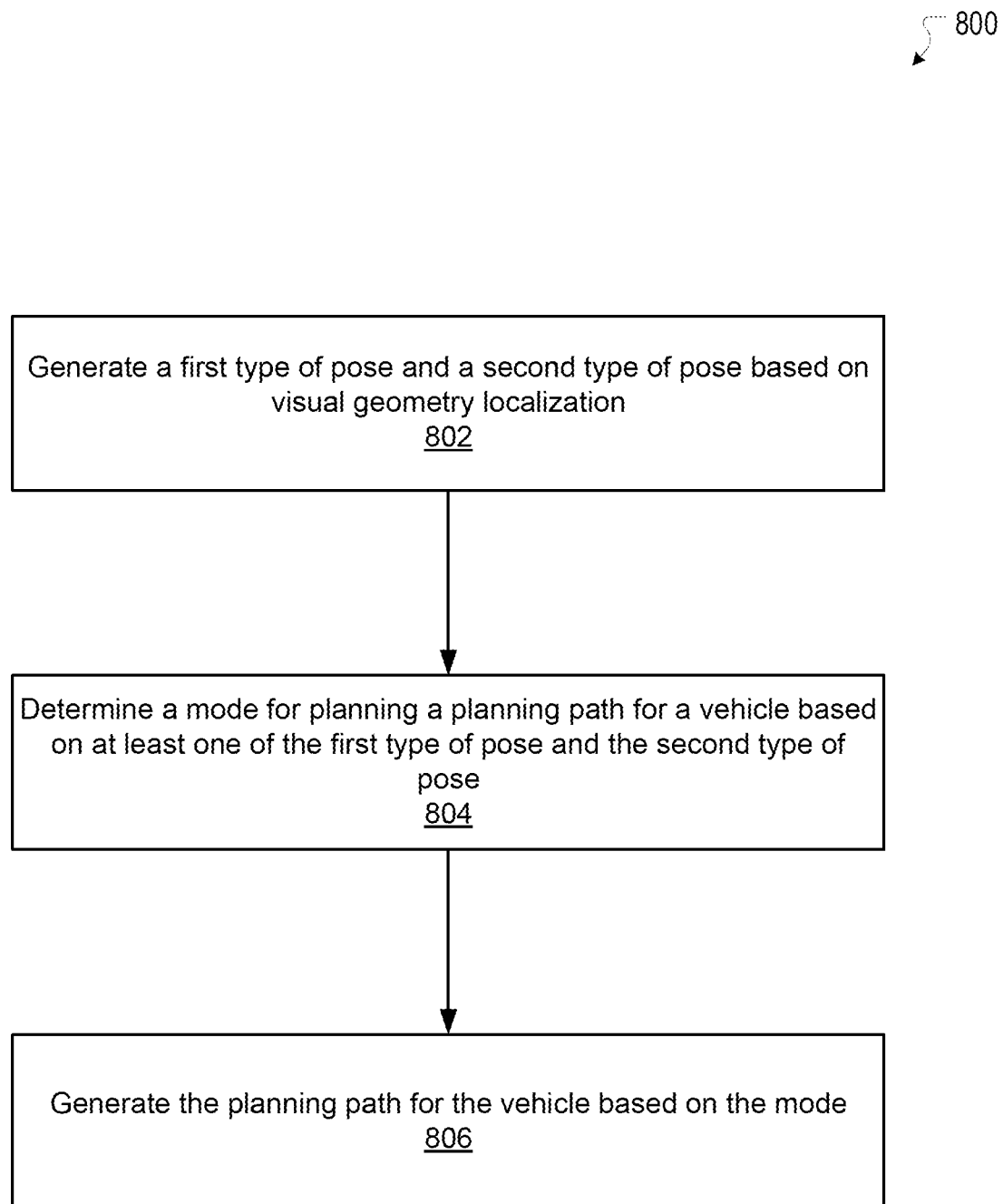
FIG. 8 illustrates an example method, according to some embodiments of the present technology.

FIG. 8 illustrates an example method 800, according to some embodiments of the present technology. The example method 800 can be applied to various aspects of visual geometry localization. For example, the example method 800 can be applied to multi-mode visual geometry localization and path planning based on the mufti-mode visual geometry localization. At block 802, the example method 800 generates a first type of pose and a second type of pose based on visual geometry localization. At block 804, the example method 800 determines a mode for planning a planning path for a vehicle based on at least one of the first type of pose and the second type of pose. At block 806, the example method 800 generates the planning path for the vehicle based on the mode. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology or at least a portion thereof can be implemented using one or more computing devices or systems that include one or more servers, such as network servers or cloud servers. The functionalities described with respect to the present technology or at least a portion thereof can be implemented using computer system 900 of FIG. 9. It should be understood that there can be many variations or other possibilities.

COMPUTER HARDWARE IMPLEMENTATION

Figure 9:
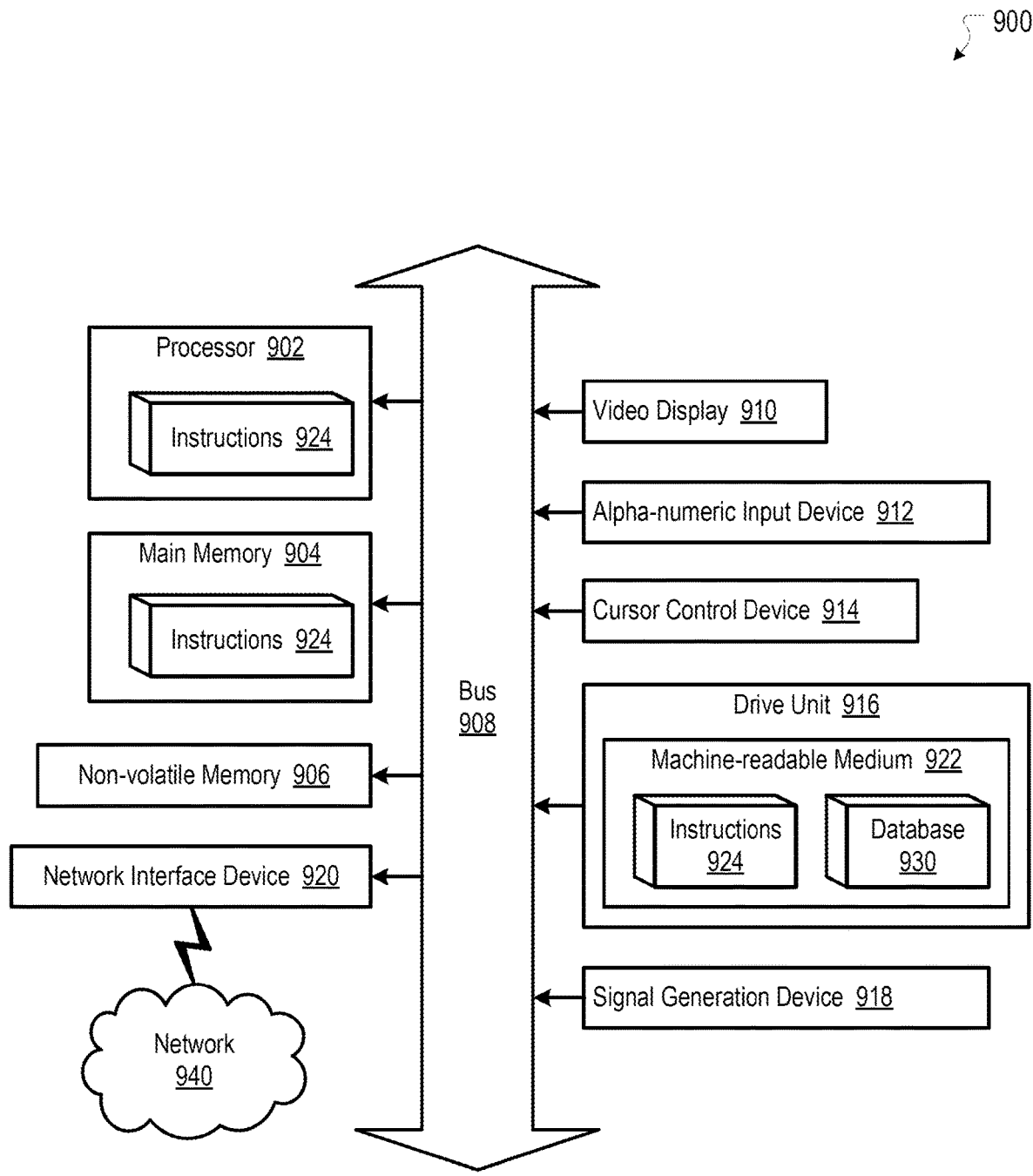
FIG. 9 illustrates an example computing system, according to some embodiments of the present technology.

The foregoing processes and features can be implemented by a wide variety of machine and computer system architectures and in a wide variety of network and computing environments. FIG. 9 illustrates an example of a computer system 900 that may be used to implement one or more of the embodiments of the present technology. The computer system 900 includes sets of instructions 924 for causing the computer system 900 to perform the processes and features discussed herein. The computer system 900 may be connected (e.g., networked) to other machines and/or computer systems. In a networked deployment, the computer system 900 may operate in the capacity of a server or a client machine in a client-server network environment, or as a peer machine in a peer-to-peer (or distributed) network environment.

The computer system 900 includes a processor 902 (e.g., a central processing unit (CPU), a graphics processing unit (CPU), or both), a main memory 904, and a nonvolatile memory 906 (e.g., volatile RAM and non-volatile RAM, respectively), which communicate with each other via a bus 908. In some embodiments, the computer system 900 can be a desktop computer, a laptop computer, personal digital assistant (PDA), or mobile phone, for example. In one embodiment, the computer system 900 also includes a video display 910, an alphanumeric input device 912 (e.g., a keyboard), a cursor control device 914 (e.g., a mouse), a drive unit 916, a signal generation device 918 (e.g., a speaker) and a network interface device 920.

In one embodiment, the video display 910 includes a touch sensitive screen for user input. In one embodiment, the touch sensitive screen is used instead of a keyboard and mouse. The disk drive unit 916 includes a machine-readable medium 922 on which is stored one or more sets of instructions 924 (e.g., software) embodying any one or more of the methodologies or functions described herein. The instructions 924 can also reside, completely or at least partially, within the main memory 904 and/or within the processor 902 during execution thereof by the computer system 900. The instructions 924 can further be transmitted or received over a network 940 via the network interface device 920. In some embodiments, the machine-readable medium 922 also includes a database 930.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 906 may also be a random access memory. The non-volatile memory 906 can be a local device coupled directly to the rest of the components in the computer system 900. A non-volatile memory that is remote from the system, such as a network storage device coupled to any of the computer systems described herein through a network interface such as a modem or Ethernet interface, can also be used.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, nonvolatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments." or in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   generating, by a computing system, a first pose of a first type and a second pose of a second type based on visual geometry localization;
   determining, by the computing system, a first difference between the first pose and the second pose over a first threshold period of time;
   determining, by the computing system, based on the first difference over the first threshold period of time, a mode for planning a planning path for a vehicle based on at least one of the first pose or the second pose; and generating, by the computing system, the planning path for the vehicle based on the mode.

2. The computer-implemented method of claim 1, wherein the first pose of the first type is a local result pose and the second pose of the second type is a global result pose.

3. The computer-implemented method of claim 2, further comprising:
generating, by the computing system, in a normal mode, a fusion result pose based on the local result pose, wherein the planning path is generated based on the fusion result pose; and
determining, by the computing system, a difference between the local result pose and the global result pose.

4. The computer-implemented method of claim 3, further comprising:
operating, by the computing system, in the normal mode based on the difference between the local result pose and the global result pose being within a threshold distance and a variance of the difference being within a threshold variance; or
operating, by the computing system, in a re-localization mode based on the difference between the local result pose and the global result pose being at least the threshold distance for a threshold period of time.

5. The computer-implemented method of claim 2, further comprising:
generating, by the computing system, in a re-localization mode, a fusion result pose based on the global result pose, wherein the planning path is generated based on the fusion result pose; and
determining, by the computing system, a second difference between the global result pose and the fusion result pose.

6. The computer-implemented method of claim 5, further comprising:
operating, by the computing system, in the re-localization mode based on the second difference between the global result pose and the fusion result pose being at least a threshold distance; or
operating, by the computing system, in a normal mode based on the second difference between the global result pose and the fusion result pose being within the threshold distance for a second threshold period of time and a variance of the second difference being within a threshold variance.

7. The computer-implemented method of claim 2, wherein the global result pose is generated based on a global search of a high definition (HD) map, wherein the local result pose is generated based on a local search of a portion of the HD map, and wherein the global search restricts the global result pose to a global range associated with a road, and wherein the local search restricts the local result pose to a local range associated with a lane in the road.

8. The computer-implemented method of claim 1, wherein a fusion result pose is generated based on localization results from localization processes other than the visual geometry localization and based on at least one of the first pose or the second pose.

9. The computer-implemented method of claim 1, wherein the mode is a normal mode, and wherein the planning path is generated based on a driving path in an HD map.

10. The computer-implemented method of claim 1, wherein the mode is a re-localization mode, and wherein the planning path is generated based on lane tracking.

11. A system comprising:
at least one processor; and
a memory storing instructions that, when executed by the at least one processor, cause the system to perform operations comprising:
generating a first pose of a first type and a second pose of a second type based on visual geometry localization;
determining a first difference between the first pose and the second pose over a first threshold period of time;
determining, based on the first difference over the first threshold period of time, a mode for planning a planning path for a vehicle based on at least one of the first type of pose and the second type of pose; and
generating the planning path for the vehicle based on the mode.

12. The system of claim 11, wherein the first pose of the first type is a local result pose and the second pose of the second type is a global result pose.

13. The system of claim 12, wherein the operations further comprise:
generating, in a normal mode, a fusion result pose based on the local result pose, wherein the planning path is generated based on the fusion result pose; and
determining a difference between the local result pose and the global result pose.

14. The system of claim 13, wherein the operations further comprise:
operating in the normal mode based on the difference between the local result pose and the global result pose being within a threshold distance and a variance of the difference being within a threshold variance; or
operating in a re-localization mode based on the difference between the local result pose and the global result pose being at least the threshold distance for a threshold period of time.

15. The system of claim 12, wherein the operations further comprise:
generating, in a re-localization mode, a fusion result pose based on the global result pose, wherein the planning path is generated based on the fusion result pose; and
determining a second difference between the global result pose and the fusion result pose.

16. A non-transitory computer-readable storage medium including instructions that, when executed by at least one processor of a computing system, cause the computing system to perform operations comprising:
generating a first pose of a first type and a second pose of a second type based on visual geometry localization;
determining a first difference between the first pose and the second pose over a first threshold period of time;
determining, based on the first difference over the first threshold period of time, a mode for planning a planning path for a vehicle based on at least one of the first pose or the second pose; and
generating the planning path for the vehicle based on the mode.

17. The non-transitory computer-readable storage medium of claim 16, wherein the first pose of the type is a local result pose and the second pose of the second type is a global result pose.

18. The non-transitory computer-readable storage medium of claim 17, wherein the operations further comprise:
generating, in a normal mode, a fusion result pose based on the local result pose, wherein the planning path is generated based on the fusion result pose; and determining a difference between the local result pose and the global result pose.

19. The non-transitory computer-readable storage medium of claim 18, wherein the operations further comprise:
    operating in the normal mode based on the difference between the local result pose and the global result pose being within a threshold distance and a variance of the difference being within a threshold variance; or
    operating in a re-localization mode based on the difference between the local result pose and the global result pose being at least the threshold distance for a threshold period of time.

20. The non-transitory computer-readable storage medium of claim 17, wherein the operations further comprise:
    generating, in a re-localization mode, a fusion result pose based on the global result pose, wherein the planning path is generated based on the fusion result pose; and
    determining a second difference between the global result pose and the fusion result pose.

\* \* \* \* \*